July 19, 1960     G. B. HORTON     2,945,722
SEAT ADJUSTER

Filed June 23, 1958     3 Sheets-Sheet 1

INVENTOR.
George B. Horton
BY
E.W. Christen
ATTORNEY

July 19, 1960 G. B. HORTON 2,945,722
SEAT ADJUSTER

Filed June 23, 1958 3 Sheets-Sheet 2

INVENTOR.
George B. Horton
BY
E. W. Christen
ATTORNEY

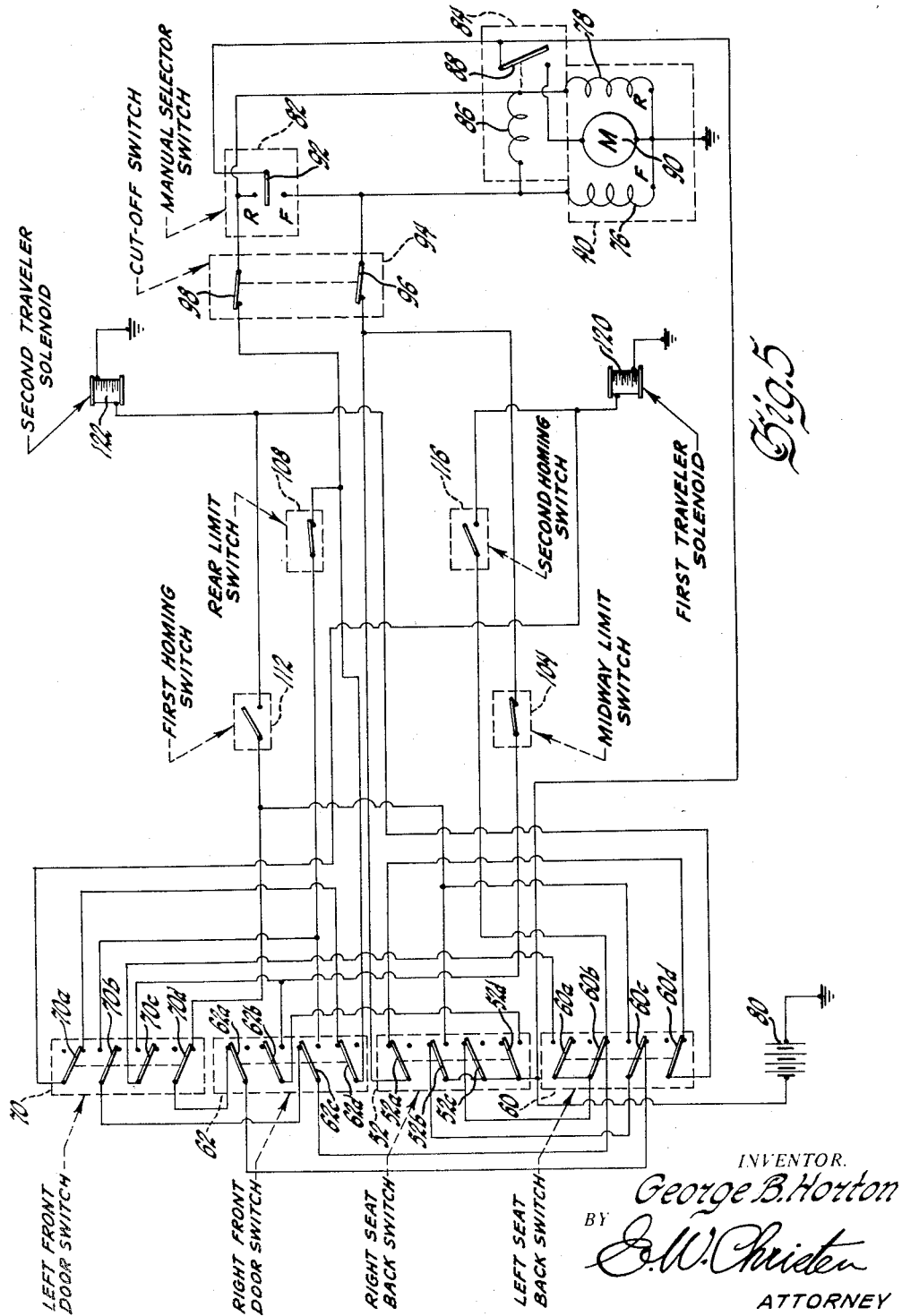

United States Patent Office 2,945,722
Patented July 19, 1960

2,945,722

SEAT ADJUSTER

George B. Horton, Garden City, Mich., assignor to General Motors Corporation, Detroit, Mich., a corporation of Delaware Filed June 23, 1958, Ser. No. 743,625

6 Claims. (Cl. 296—65)

This invention relates to adjustable seats for vehicles and particularly to seats which adjust automatically in response to certain vehicle conditions.

Power-operated adjustable seats in present day vehicles allow the driver to adjust the seat in horizontal direction and, in many cases, in vertical direction. The present invention is particularly directed to an automatic control for the horizontal adjustment although its teaching can be utilized to additionally provide an automatic control for vertical adjustment.

With a power-operated seat adjuster, the driver selects a comfortable position which is generally between the front and rear mechanical limits of seat travel and he is obliged to move the seat to the rear limit to effect an easy exit or entrance due to interference by the steering wheel. In coupes, and in some 4-door hardtops, a rearwardly adjusted driver's seat interferes with the ready exit or entrance of rear seat passengers so a courteous driver is obliged to move the seat forward to accommodate their passage. This can be annoying to the driver for he loses his comfortable position and frequently must make many minor adjustments before he finds it again.

The invention provides a simple and inexpensive automatic control mechanism for a power-operated seat adjuster to make the desired exit and entrance seat adjustments and to then adjust the seat to the comfortable position.

In the drawings:

Figure 5 is a control circuit diagram for the seat adjuster.

Figure 1:
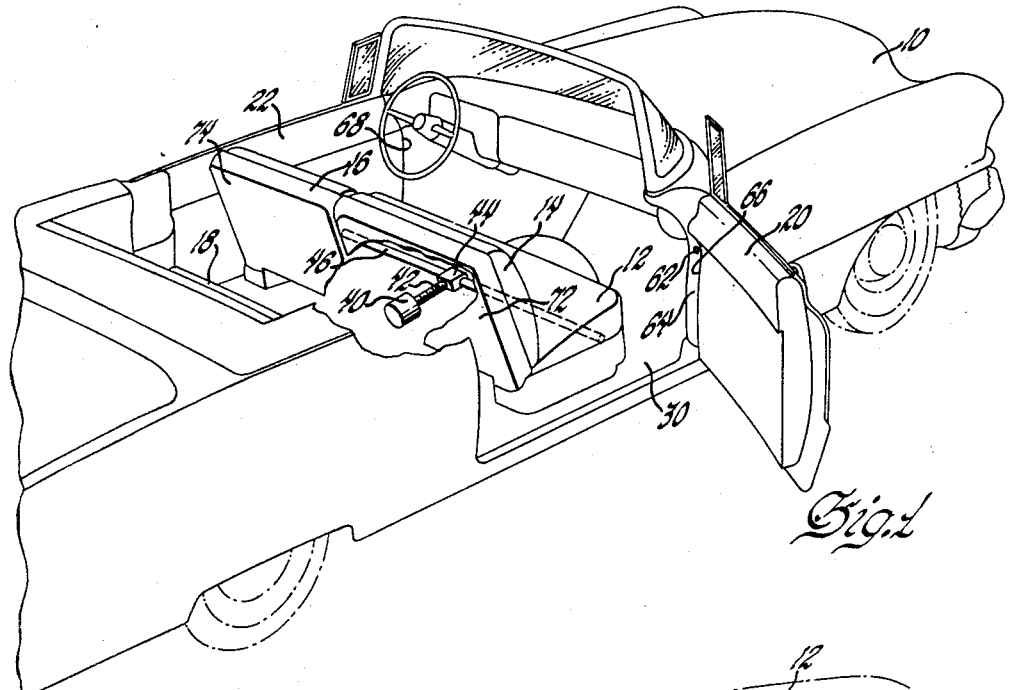
Figure 1 is a perspective view, partially broken away, of a vehicle incorporating the automatic seat adjuster.
Figure 2:
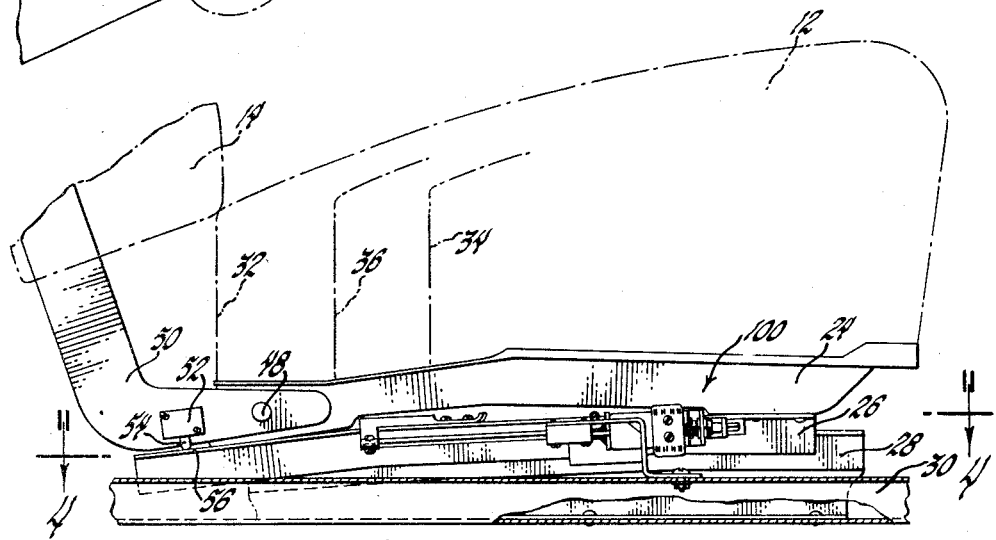
Figure 2 is a right elevation of the seat adjuster.
Figure 3:
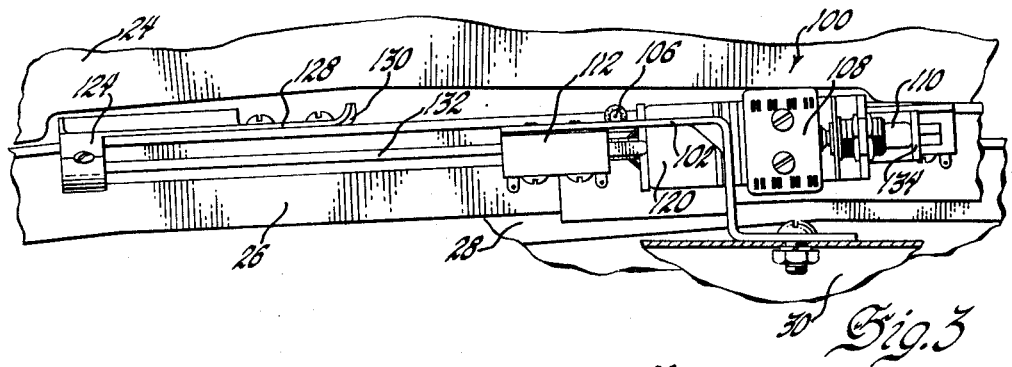
Figure 3 is an enlarged right elevation of the seat adjuster.
Figure 4:
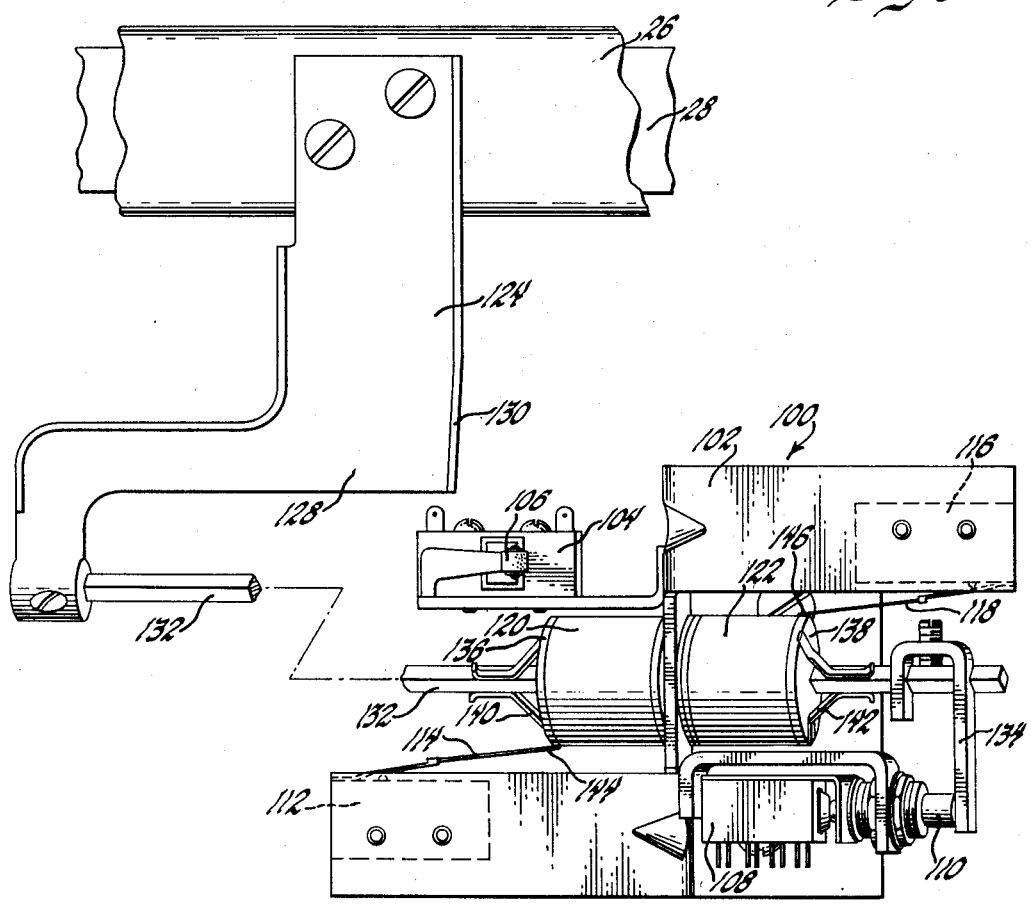
Figure 4 is a partial plan view of the seat adjuster taken on the plane indicated by the line 4—4 of Figure 2.

Referring to the drawings, a vehicle 10 has a front or driver's seat 12 with individually tiltable seat backs 14 and 16, a rear seat 18 and front doors 20 and 22. The seat 12 has a frame 24 to which is secured on either side upper tracks 26 which are slidably secured on lower tracks 28 that are fixed to the vehicle floor 30, only the tracks for the right side of the seat being shown. The seat adjuster tracks allow the seat 12 to move in fore and aft direction from a rearward mechanical limit position 32 to a forward mechanical limit position 34, a midway position 36 being also indicated. A reversible motor 40 is secured to the floor 30 and provides fore and aft power for the seat 12 through a screw 42 which has a nut 44 threaded thereon, the nut being secured to a cross-bar portion 46 of the seat frame 24. The seat backs 14 and 16 are pivotally supported on the frame 24 by pivots 48 so that they may be independently tilted in a forward direction from the normal position shown.

A frame portion 50 of the right seat back 14 carries a switch 52 having an actuator arm 54 that operates the switch through engagement or disengagement with a portion 56 of the upper track 26 so that the switch is actuated when the seat back 14 is tilted. The left seat back 16 carries a similar switch 60. A similar switch 62 is mounted in the right front door pillar 64 and is actuated whenever it is engaged by or disengaged from the forward edge 66 of the right door 20. The left door pillar 68 has a similar switch 70 mounted therein. Should the invention be applied to a 4-door hardtop with fixed front seat backs, the seat back switches 52 and 60 may be secured to the right and left sides of the rear of the seat back as at 72 and 74 for direct manual actuation.

The reversible motor 40 has a forward winding 76 and a reverse winding 78, either of which may be energized from a battery 80 through a manual selector switch 82 which is suitably located within easy reach of the driver, as at the left side of the seat frame 24. A relay switch 84 has a coil 86 connected across the motor windings and closes spring opened contact 88 whenever either winding is energized to supply current to the motor armature 90. By manipulating the spring opened contact 92 of the selector switch 82 to the R or F position, the driver may power the seat to any comfortable position. The door switches 62 and 70 and the seat back switches 52 and 60 are also adapted to control the seat position by connecting the battery 80 through an automatic control circuit which connects to the motor windings 76 and 78 through a manual cut-off switch 94 which is conveniently located to the driver. The manual cut-off switch 94 has gang contacts 96 and 98 which can be opened by the driver should he desire to remove the seat from automatic control.

The automatic control provides a means whereby the seat is automatically moved from the comfortable position to the rear limit position 32 when either door is opened to facilitate the exit or entrance of the driver and front seat passengers. It also provides a means to automatically move the seat forward to the midway position 36 when either seat back is tilted to facilitate the exit or entrance of a rear seat passenger providing the corresponding door is open. When the seat backs are returned to upright position and the doors are closed, the control automatically returns the seat to the comfortable position. The automatic control is ineffective whenever the doors are closed to prevent disturbing the driver while the vehicle is under way.

The control unit, in addition to the door and seat back switches, consists of a simple assembly 100, portions of which are fixed to the floor 30 and other portions of which are fixed to the seat 12 to move therewith. The portions fixed to the floor can be secured to the seat and the portions secured to the seat can be secured to the floor if desired.

The fixed portion of the control 100 has a bracket 102 which fastens to the floor 30 or to the stationary lower track 28. The bracket 102 carries a midway limit switch 104 having an actuating lever 106, a rear limit position switch 108 having an actuating plunger 110, a first homing switch 112 having an actuating lever 114, a second homing switch 116 having an actuating lever 118, a first travel holding solenoid 120 having a bore therethrough and a second traveler holding solenoid 122 having a bore therethrough; the limit switches 104 and 108 having spring closed contacts and the homing switches 112 and 116 having spring opened contacts.

The movable portion of the control unit 100 includes a bracket 124 which is secured to the upper track 26 and which has a cam track portion 128 and rounded edge 130 that are aligned with the switch lever 106 to open the midway limit switch 104 whenever the seat is shifted forwardly of position 36. The bracket 124 also mounts a nonmagnetizable rod 132 that extends through the bores of the solenoids 120 and 122 and that carries a forward finger 134. The finger 134 engages the plunger 110 to open the rear limit switch 108 when the seat 12 is in the rear position 32.

The rod 132 carries first and second magnetizable traveler plungers 136 and 138, the traveler 136 being slidably received by the bore of the solenoid 120 and frictionally coupled to the rod by spring fingers 140 and the traveler 138 being received by the solenoid 122 and frictionally coupled to the rod by spring fingers 142.

The travelers 136 and 138 engage the switch levers 114 and 118 at 144 and 146 when the seat is in the comfortable position to open the homing switches 112 and 116, the switches being closed whenever the travelers leave the solenoids. When the seat 12 is moved rearwardly, the rod 132 will carry the traveler 136 with it unless the solenoid 120 is energized; the traveler 138 remaining stationary because of mechanical engagement with the solenoid 138. When the seat is moved forwardly, the rod 132 will carry the traveler 138 unless the solenoid 122 is energized; the traveler 136 remaining stationary because of mechanical engagement with the solenoid 120. The seat may be moved forwardly or rearwardly without either traveler moving as long as its solenoid is energized.

Operation

Referring particularly to Figure 5, the control circuit is shown with the doors in closed position and the seat backs in normal position. The door switches 62 and 70 and the seat back switches 52 and 60 are gang switches each having four movable contacts which are referenced a, b, c and d.

(1) If the doors are closed with the seat backs in normal position and the driver desires to make a forward or rearward adjustment to obtain a comfortable position, he need only move the selector switch 82 to the F or R position to directly energize the motor windings 76 or 78 from the battery 80. Should the cut-off switch 94 be closed as indicated, the solenoid 120 or the solenoid 122 will also be energized. If a forward adjustment is made, the selector switch 82 will energize the solenoid 122 through the switch contacts 96, 52a and 60d to hold the traveler 138 from moving forward with the rod 132. The traveler 136 will not move forward because of engagement with the solenoid 120. If the driver adjusts the seat rearwardly, the selector switch 82 will energize the solenoid 120 through the switch contacts 98, 62d and 70a to hold the traveler 136 from moving rearward with the rod 132. The traveler 138 will not move rearward because of engagement with the solenoid 122. Both travelers 136 and 138 thus remain stationary while the seat is adjusted in either direction to set up the comfortable position to which the seat will return after automatic movements initiated by operation of the doors and seat backs. In either the forward or rearward mechanical limit positions of the seat, the motor 40 will stall should the driver keep the selector switch 82 engaged.

(2) With the seat in a comfortable position, opening of the left door with the seat backs in normal position will shift the switch 70 and energize the motor winding 78 from the battery 80 through the switch contacts 52c, 60b, 62c, 70b, 108 and 98 to shift the seat to the rear limit position 32 whereupon the rear limit switch 108 will open to break the circuit and stop the motor. As the seat is moved to the rear, the rod 132 will carry the traveler 136 for the solenoid 120 is deenergized and the first homing switch 112 will thus be closed. The traveler 136 thus marks the comfortable seat position with reference to the first homing switch 112. The traveler 138 will remain stationary because of engagement with the solenoid 122. A similar condition prevails if the right door is opened, the motor winding 78 being energized from the battery 80 through the switch contacts 52c, 60b, 62c, 108 and 98. The driver is thus afforded easy exit or entrance.

(3) When both doors are closed with the seat backs in normal position, the motor winding 76 is energized to return the seat forwardly to the comfortable position through the switch contacts 52b, 60c, 62a and 70d, the first homing switch 112 and the switch contacts 60d, 52a and 96. During this time the solenoid 122 is energized to keep the traveler 138 from moving forward with the rod 132. When the seat reaches the comfortable position marked by the traveler 136, the first homing switch 112 is opened by the traveler to break the circuit and stop the motor. The driver is thus returned to a comfortable position.

(4) When the left seat back is tilted forward after the left door is opened to shift the switches 60 and 70, the motor winding 76 is energized from the battery 80 by way of the switch contacts 52c, 60a and 70c, the midway limit switch 104 and the switch contact 96 to move the seat forward to the midway position 36 where the circuit is broken by the cam track 128 opening the midway limit switch 104 to stop the motor 40. The traveler 138 marks the comfortable seat position and will move forward with the rod 132 as the solenoid 122 is deenergized thus closing the second homing switch 116. The traveler 136 will move forward with the rod 132 and be stopped by engaging the solenoid 120 (unless the comfortable position was to the rear of the midway position 36). In a like fashion, if the right seat back is tilted forward and the right door is opened to shift the switches 52 and 62, the motor winding 76 is energized from the battery 80 by way of the switch contacts 52d and 62b, the midway limit switch 104 and the switch contact 96 to move the seat forward to the midway position 36 where the circuit is broken by the cam track 128 opening the midway limit switch 104 to stop the motor 40. The traveler 138 is again the comfortable seat position marker as the solenoid 122 is deenergized and is carried forward by the rod 132 thus closing the second homing switch 116. The traveler 136 will be stopped by engaging the solenoid 120 providing the comfortable position was forward of the midway position 36. In either case, easy passage of a rear seat passenger is afforded. Should the right seat back be tilted forward with only the left door open or the left seat back be tilted with only the right door open, no seat back control circuit is set up as this condition does not indicate a normal exit of a rear seat passenger and the seat will move to the rear limit position 32 as in (2) above.

(5) Should the comfortable seat position be rearward of the midway limit position 36 and the left seat back be returned to normal position with the left door open and the seat in the midway limit position 36, the seat will move rearward as the motor winding 78 is energized from the battery 80 through the switch contacts 52c, 60b, 62c and 70b, the rear limit switch 108 and switch contact 98. The second traveler 138 acts as the comfortable position marker and the first traveler solenoid 120 will be energized through the switch contacts 52c and 60b and the second homing switch 116 to hold the first traveler 136 from moving rearward with the rod 132 until the second traveler 138 opens the second homing switch 116 to break the solenoid circuit which will take place when the seat reaches the comfortable position. The first traveler 136 thereafter acts as the marker of the comfortable seat position as in (2) above and the seat will move on to the rear limit position 32. A similar condition prevails if the right seat back is returned to normal position with the right door open, the solenoid circuit being the same and the motor winding circuit being through contacts 52c, 60b, 62c, 108 and 98. If the comfortable seat position was forward of the midway limit position 36 when a seat back was returned to normal position with the corresponding door open, the action is similar except that the energization of the first traveler solenoid 120 will not hold the traveler 136 because the traveler is spaced to the rear thereof and the seat will proceed directly to the rear limit position 32 as in (2) above. In any case, when the doors are then closed the seat will return to the comfortable position as in (3) above.

(6) If the doors are closed and either seat back is tilted forward nothing occurs for no circuit is set up to the motor windings. The driver is thus protected against a forward seat movement during driving which could be caused by an accidental seat tilting.

While the illustrated embodiment shows automatic control by both the doors and the seat backs, in some vehicles the seat back control can be dispensed with thus affording a more economic construction. In that case the switches 52, 60, 104 and 116, the solenoid 122 and the traveler 138 are eliminated.

While the embodiment of the invention here described is preferred other embodiments may be made within the scope of the invention.

I claim:

1. A vehicle seat adjuster comprising a pair of elements, power means for moving one element relative the other element, and control means for the power means including a solenoid secured to one of the elements, a magnetizable member having a frictional coupling with the other one of the elements and adapted to move adjacent the solenoid with relative movements of the elements, and means for energizing the solenoid during some relative movements of the elements to hold the magnetizable member to the solenoid and for deenergizing the solenoid during other relative movements of the elements to release the magnetizable member from the solenoid.

2. A vehicle seat adjusted comprising a pair of elements, power means for moving one element relative the other element, and control means for the power means including a pair of solenoids secured to one of the elements, a pair of magnetizable members each having a frictional coupling with the other one of the elements and adapted to move adjacent a respective solenoid with relative movements of the elements, and means for energizing the solenoids during some relative movements of the elements to hold the magnetizable members to the solenoids and for deenergizing the solenoids during other relative movements of the elements to release the magnetizable members from the solenoids.

3. A vehicle seat adjuster comprising a fixed element, a movable element, power means for moving the movable element, and control means for the power means including a solenoid secured to the fixed element, a magnetizable member having a frictional coupling with the movable element and adapted to move adjacent the solenoid with movements of the movable element, and means for energizing the solenoid during some movements of the movable element to restrain the magnetizable member from following such movements and for deenergizing the solenoid during other movements of the movable element to permit the magnetizable member to follow such other movements.

4. A vehicle seat adjuster comprising a fixed element, a movable element, power means for moving the movable element, and control means for the power means including a pair of solenoids secured to the fixed element, a pair of magnetizable members each having a frictional coupling with the movable element and adapted to move adjacent a respective solenoid with movements of the movable element, and means for energizing the solenoids during some movements of the movable element to restrain the magnetizable members from following such movements and for deenergizing the solenoids during other movements of the movable element to permit the magnetizable members to follow such other movements.

5. In combination with a vehicle, a body including a seat and a door, the seat being mounted on the body by a seat position adjusting mechanism, a power actuator connected with the mechanism for displacing the seat in the body, a manually operable control for energization of the power actuator to displace the seat to various positions, an element secured to the body, another element secured to the seat, means for storing information of a particular selected position comprising a solenoid secured to the body element and a magnetizable member having a frictional coupling with the seat element and adapted to move adjacent the solenoid with movements of the seat element, and door actuable means associated with the storage means and responsive to door opening and door closing for energizing the power actuator without energizing the solenoid to displace the seat to a rearward terminal position and to the selected position set by the magnetizable member, displacement of the seat from the selected position through operation of the manually operable control energizing the solenoid so that the magnetizable member is restrained from following the seat displacement to thereby establish a new selected position.

6. In combination with a vehicle, a body including a seat and a door, the seat being mounted on the body by a seat position adjusting mechanism, the seat having a tiltable seat back, a power actuator connected with the mechanism for displacing the seat in the body, a manually operable control for energization of the power actuator to displace the seat to various positions, an element secured to the body, another element secured to the seat, means for storing information of a particular selected position comprising a pair of solenoids secured to the body element and a pair of magnetizable members each having a frictional coupling with the seat element and adapted to move adjacent the respective solenoids with movements of the seat element, door actuable means associated with the storage means and responsive to door opening and door closing for energizing the power actuator without energizing one solenoid to displace the seat to a rearward terminal position and to the selected position set by the magnetizable member associated with the one solenoid, and seat back actuable means associated with the storage means and responsive to seat back tilting when the door is open for energizing the power actuator without energizing the other solenoid to displace the seat to a midway terminal position and to the selected position set by the other magnetizable member, displacements of the seat from the selected position through operation of the manually operable control energizing the particular solenoids so that the magnetizable members are restrained from following the seat displacements to thereby establish a new selected position.

References Cited in the file of this patent

UNITED STATES PATENTS 2,823,949     Williams et al. _____ Feb. 18, 1958
2,829,002     Leavengood et al. _____ Apr. 1, 1958